US 12,094,057 B2

(12) United States Patent
Liu et al.

(10) Patent No.: US 12,094,057 B2
(45) Date of Patent: Sep. 17, 2024

(54) METHOD FOR SCHEDULING AND DISPLAYING THREE-DIMENSIONAL ANNOTATIONS

(71) Applicant: Guangxi Zhuang Autonomous Region Natural Resources Remote Sensing Institute, Nanning (CN)

(72) Inventors: Rundong Liu, Nanning (CN); Ruibo Chen, Nanning (CN); Shuhong Mei, Nanning (CN); Qing Liu, Nanning (CN); Chanling Pan, Nanning (CN); Mincan He, Nanning (CN); Jinyun Chen, Nanning (CN); Lijuan He, Nanning (CN); Shuai Wu, Nanning (CN); Ziyuan Bao, Nanning (CN)

(73) Assignee: Guangxi Zhuang Autonomous Region Natural Resources Remote Sensing Institute, Nanning (CN)

( * ) Notice: Subject to any disclaimer, the term of this patent is extended or adjusted under 35 U.S.C. 154(b) by 0 days.

(21) Appl. No.: 18/464,022

(22) Filed: Sep. 8, 2023

(65) Prior Publication Data
US 2024/0087228 A1     Mar. 14, 2024

(30) Foreign Application Priority Data
Sep. 14, 2022   (CN) .......................... 202211113098.2

(51) Int. Cl.
*G06T 17/05*     (2011.01)
*G06T 3/18*     (2024.01)
(Continued)

(52) U.S. Cl.
CPC ............... *G06T 17/05* (2013.01); *G06T 7/11* (2017.01); *G06T 11/20* (2013.01); *G06V 10/751* (2022.01); *G06T 3/18* (2024.01); *G06T 11/60* (2013.01)

(58) Field of Classification Search
None
See application file for complete search history.

(56) References Cited

U.S. PATENT DOCUMENTS 8,260,006 B1 *   9/2012   Callari .................. G06V 10/94
                                              345/631
11,204,896 B2 *   12/2021   Albrecht ................. G06F 16/13
(Continued)

OTHER PUBLICATIONS

Search report of CN202211113098.2.
Notification to Grant Patent Right.
A Web 3D annotation display technique in large scenes.

*Primary Examiner* — Jeffrey J Chow

(57) ABSTRACT

A method for scheduling and displaying three-dimensional annotations is provided, relating to the field of realistic three-dimensional visualization technology. The present disclosure covers data services, data scheduling schemes, data storage schemes, annotation avoidance schemes, and annotation efficient display schemes. Users can use this disclosure to schedule and display massive three-dimensional annotations in WebGL at high frame rates while consuming extremely low performance. It solves the problem of text inversion and non-hierarchical zooming of three-dimensional maps in traditional annotation and slicing services which can cause text to appear larger or smaller, breaking through the technical bottleneck that traditional annotation and slicing services that cannot be superposition displayed on 3D models. By using this disclosure, massive annotation data can be displayed without slicing, and rich annotation styles can be customized and displayed by users, providing a more advanced annotation display solution for realistic three-dimensional visualization technology.

6 Claims, 8 Drawing Sheets

(51) Int. Cl.
*G06T 7/11* (2017.01)
*G06T 11/20* (2006.01)
*G06T 11/60* (2006.01)
*G06V 10/75* (2022.01)

(56) References Cited

U.S. PATENT DOCUMENTS

| | | | |
|---|---|---|---|
| 2007/0233379 A1* | 10/2007 | Bowman | G06T 11/60 |
| | | | 701/431 |
| 2017/0011089 A1* | 1/2017 | Bermudez Rodriguez | |
| | | | G06F 16/9537 |
| 2018/0210912 A1* | 7/2018 | Radus | H03M 7/3068 |
| 2021/0199442 A1* | 7/2021 | Xie | G06V 20/588 |
| 2023/0353763 A1* | 11/2023 | Klement | G01C 21/3852 |

* cited by examiner

METHOD FOR SCHEDULING AND DISPLAYING THREE-DIMENSIONAL ANNOTATIONS

CROSS-REFERENCE TO RELATED APPLICATIONS

This application claims to the benefit of priority from Chinese Application No. 202211113098.2 with a filing date of Sep. 14, 2022. The content of the aforementioned applications, including any intervening amendments thereto, are incorporated herein by reference.

TECHNICAL FIELD

The present disclosure relates to the field of realistic three-dimensional visualization technology, in particular to a method for scheduling and displaying three-dimensional annotations.

BACKGROUND

Realistic three-dimensional is a digital virtual space that realistically, stereoscopically, and sequentially reflects and expresses the natural physical space on which humans rely for survival, production, and life. In recent years, China has actively promoted the construction of realistic three-dimensional China. The development of the country requires spatial information to move from two-dimensional to three-dimensional in order to better achieve refined urban management. There are many unresolved challenges in transitioning from traditional two-dimensional maps to three-dimensional maps, among which annotations play an important role in maps. In Current, there are generally the following issues with three-dimensional annotations in WEB three-dimensional maps:
(1) two-dimensional maps often fix the due north direction and cannot rotate arbitrarily. However, the characteristic of three-dimensional maps that can rotate freely causes text inversion when loading directional address slicing services, as shown in FIG. 1. This is not aesthetically pleasing for three-dimensional displays and does not conform to the characteristics of three-dimensional;
(2) Non-hierarchical scaling of three-dimensional maps is also different from the hierarchical zooming of two-dimensional maps, as shown in FIG. 2. When the sliced place name address service is loaded onto the three-dimensional map, the text sometimes will appear larger or smaller, and it cannot maintain a fixed size at any level;
(3) As shown in FIG. 3, in traditional three-dimensional map annotation, the slicing service of place names and addresses is rendered in the form of images, which cannot be overlaid on the realistic three-dimensional model, making the slicing service of place names and addresses less useful in the three-dimensional model;
(4) The traditional three-dimensional map annotation can achieve three-dimensional display of annotations by adding single or multiple points to the map, but it lacks an overall scheduling plan to optimize the display, and lacks of avoidance optimization, making it impossible to schedule and display a large range of annotation data.

SUMMARY

The present disclosure aims to solve at least one of the technical problems mentioned above, providing a method for scheduling and displaying three-dimensional annotations, in order to solve the problem that the existing three-dimensional maps are unable to schedule the display of a large range and a large amount of annotation data, and are prone to overlapping and inverted of annotations, as well as unable to realise non-hierarchical scaling of annotations.

In order to achieve the above objectives, the technical solution adopted by the present disclosure is: a method for scheduling and displaying three-dimensional annotations, which includes the following steps:
step 1, using a map server to publish WFS services, providing data services that support spatial geometric relationship queries and attribute domain queries for a browser end;
step 2, dividing a map into a fixed number and a fixed size of grids through applying a non-hierarchical fixing grid method; after a map scale is greater than 1:30000, finding grids that intersects a visible range of the map; taking one grid as an unit, and requesting GeoJSON data from the map server;
step 3, constructing a data storage structure on the browser end, applying R-Tree to receive and store GeoJSON point data from the map server; after receiving the point data, initializing an avoidance based on a relationship between difference in screen pixel and difference in latitude and longitude at different scales of two identical points, and storing avoidance results in different data structures according to different scales;
step 4, calculating the visible range of the map when a perspective of the map changes, and calculating a relationship between difference in screen pixel and difference in latitude and longitude of two different points on the map at a current scale; retrieving the data stored in a browser according to the R-Tree algorithm, if grids that intersect with this range does not obtain data from the map server, requesting data from the map server by taking one grid as an unit, and storing the data in a browser cache;
step 5, obtaining a pixel value represented by 1 degree longitude and latitude by comparing the difference in screen pixel and the difference in latitude and longitude between different points at the current scale of the map in Web Worker multi-threading, so as to obtain a pixel width and a pixel height of an annotation point; calculating an avoidance relationship of the annotation point through the longitude, the latitude, the pixel width and the pixel height of the annotation point, and preliminarily filtering out overlapping data in the multi-threading;
step 6, performing a further refine avoidance on the result data in step 5 in a UI main thread, converting latitude and longitude coordinates and screen pixel coordinates to obtain a screen pixel position displayed in annotations from the current perspective, and performing an avoidance calculation with other displayed annotations;
step 7, performing a rasterization processing on vector texts, drawing texts in the multi-threading by using OffscreenCanvas, and converting the texts to raster images;
step 8, adding the annotations that need to be displayed to the map through the raster images of the longitude and latitude coordinates and the texts, wherein the annotations that have already been displayed are cached in a memory of the browser, and the annotations that do not need to be displayed from the current perspective are temporarily hidden.

Preferably, in step 2, dividing lines at intervals of 0.2 degrees between a longitude of −180 degrees to 180 degrees and a latitude of −90 degrees to 90 degrees on the map, and dividing the map into a fixed grid with a width of 0.2 degrees*0.2 degrees; then, when the perspective of the map changes, the intersection calculation is performed using a perspective range of the map and grids of the map, grids that intersects with the perspective range requests data from the server and stores the data in the browser.

Preferably, in step 3, preliminarily calculating a height and a width of the text based on a style of the text, a content of the text, and numbers of line breaks of the text; performing a data initialization avoidance according to the "pixel value represented by 1 longitude and latitude" of different hierarchies of the map, and dividing the result data of the data initialization avoidance of each hierarchy of the map into different data structures for storage, with a largest layer storing all the data in full volume.

Preferably, in step 4, the data is in a tree structure with fixed levels, each node on a tree represents a rectangle, all leaf nodes represent a piece of data, and each parent node represents a minimum bounding rectangle of all child node sets; retrieving the corresponding data structure stored in the browser according to the difference in screen pixel and the difference in longitude and latitude between two different points, then, taking an outer rectangle of the visible range as a search criteria, first searching for a root node, if it intersects with the root node, continuing to search for its child nodes, and so on until the leaf node is retrieved, obtaining all data within the visible range.

Preferably, in step 5, the pixel value represented by 1 degree longitude and latitude is named A, and the visible range of the map is named C, A and C are sent into the Web Worker multi-threading, the corresponding stored data structure is found through A, the data in A is searched through C; through searching to obtain the longitude and latitude, the annotation width, and the height of the annotation point are obtained, calculating the avoidance relationship of the annotations, and preliminarily filtering out the overlapping data.

Preferably, in step 6, the screen pixel position where the annotation point is located is determined based on the longitude and latitude of the annotation; when the obtained pixel position is greater than an actual value of a screen or less than 0, it represents that the annotation is not currently displayed on the screen; constructing an Rbush data structure B, according to the screen pixel coordinates, the height, and the width of the annotation, to retrieve whether a range of the annotation intersects with the displayed annotation range in B, if it does not intersect, adding the range of the annotation to B, indicating that it needs to be displayed.

Preferably, in step 7, sending text contents, stroke widths, stroke colors, text sizes, text fonts, text fill colors, and line breaks into the Web Worker multi-threading as parameters; calculating the height and the width required for converting the texts into an image, creating the image using OffscreenCanvas, and drawing the image according to the text style; finally, performing a rasterization processing on the image, and returning the rasterized image to the main thread for display in the WebGL map.

Compared with the prior art, a method for scheduling and displaying three-dimensional annotations in the present disclosure has the following advantageous effects:

1. The annotation uses a non-hierarchical fixing grid method, which no longer loads onto the three-dimensional map in a slicing manner, effectively avoiding the problem of annotation text inversion in the three-dimensional map, and can schedule the loading of a large range of annotation data;
2. Annotations can maintain non-hierarchical scaling and maintain a fixed size throughout any range of three-dimensional maps, improving the aesthetics of the map;
3. Annotations can be displayed and conduct avoidance in real-time to avoid overlapping annotations;
4. A large number of annotations can be efficiently displayed on the web three-dimensional platform.

BRIEF DESCRIPTION OF THE DRAWINGS

The following is a further detailed explanation of the specific implementation method of the present disclosure in conjunction with the accompanying drawings, wherein.

DETAILED DESCRIPTION OF THE EMBODIMENTS

The following will provide a clear and complete description of the technical solution in the embodiments of the present disclosure in conjunction with the accompanying drawings. Obviously, the described embodiments are only a part of the embodiments of the present disclosure, not all of them. Based on the embodiments in the present disclosure, all other embodiments obtained by ordinary skilled person in the art without creative labor fall within the scope of the present disclosure.

It should be noted that when a component is referred to as "fixed to" another component, it may be directly or indirectly attached to another component. When a component is considered to be "connected" to another component, it may be directly connected to another component or there may be a centered component arranged between the two. When a component is considered "set to" another component, it may be directly set to another component or there may be a centered component arranged between the two. When a component is called "arranged at the middle", it is not just arranged at the middle position, as long as it is not arranged at both ends, it belongs to the range limited by the "middle". The terms "vertical", "horizontal", "left", "right", and similar expressions used in this disclosure are for illustrative purposes only.

Unless otherwise defined, all technical and scientific terms used in this disclosure have the same meanings as those commonly understood by those skilled in the art of the present disclosure. The terms used in the specification of the present disclosure in this disclosure are only for the purpose of describing specific embodiments and are not intended to limit the present disclosure. The term "and/or" used in this disclosure includes any and all combinations of one or more related listed items.

Figure 1:
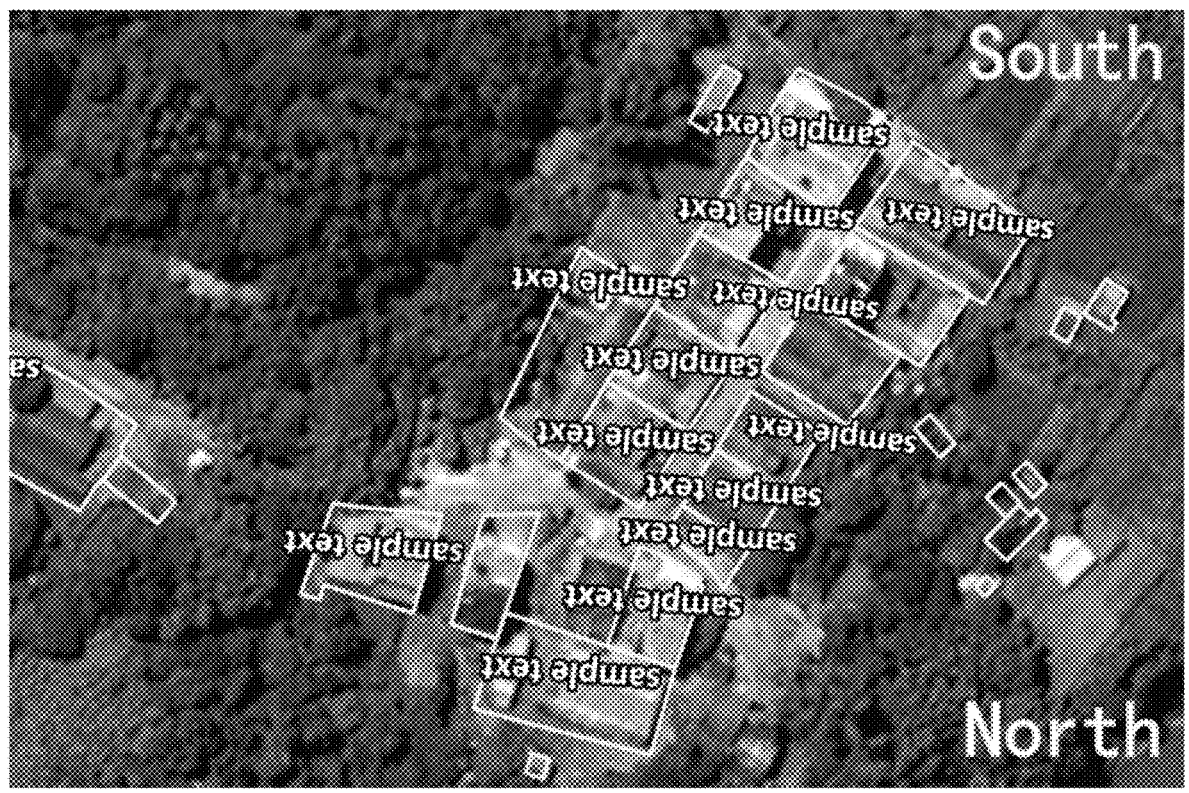
FIG. 1 is a schematic diagram of text inversion in a three-dimensional map annotated using existing technology.
Figure 2:
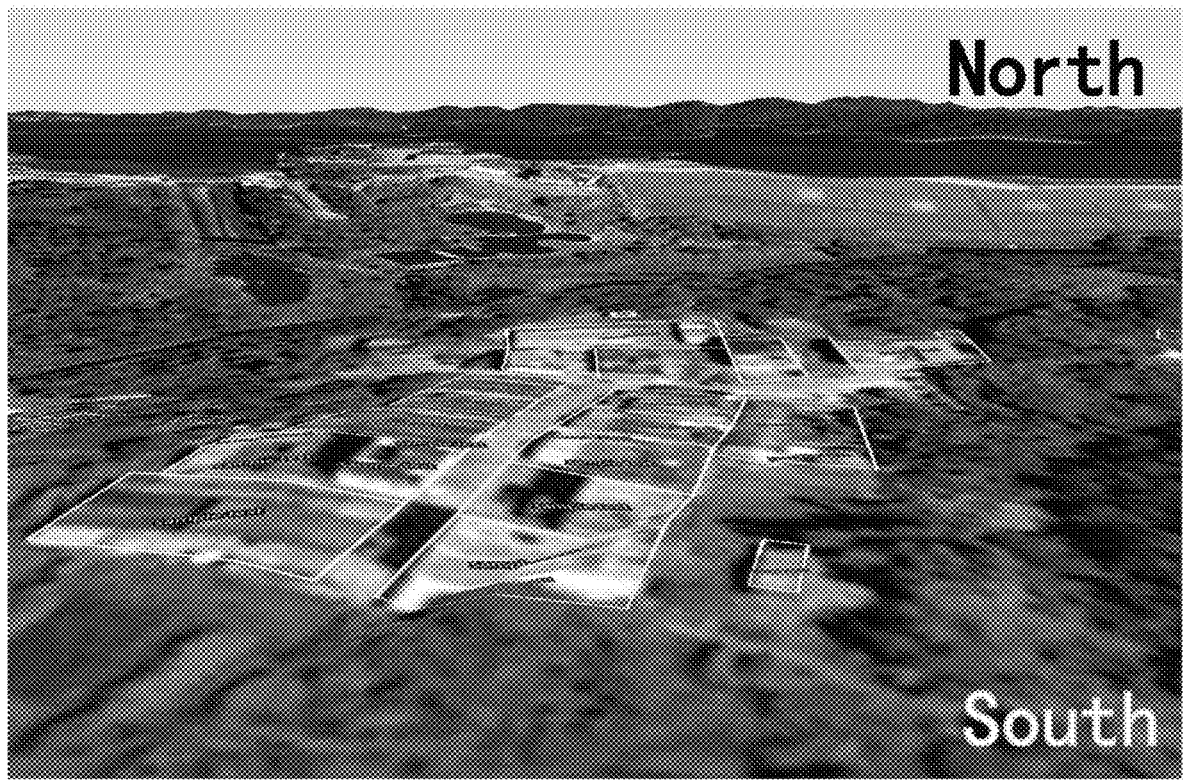
FIG. 2 is a schematic diagram of the situation where annotation cannot achieve non-hierarchical scaling in a three-dimensional map annotated using existing technology.
Figure 3:
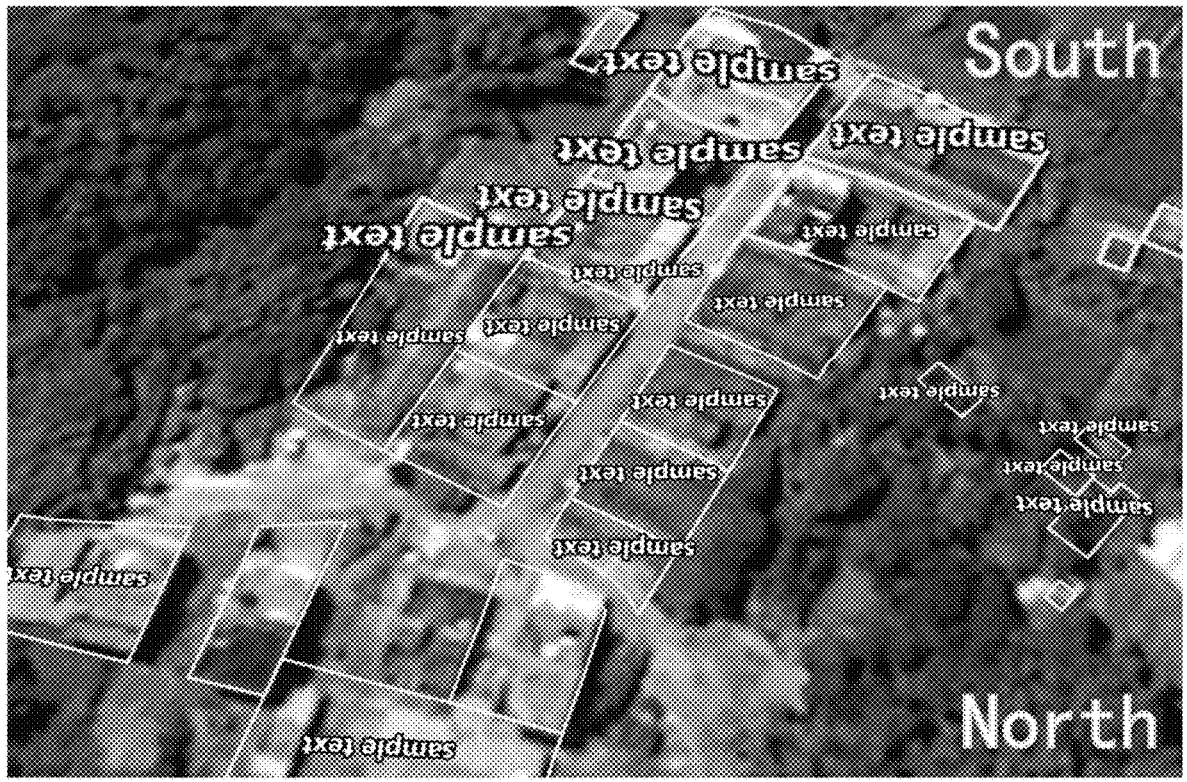
FIG. 3 is a schematic diagram of the situation where annotations cannot achieve overlay display in a three-dimensional map annotated using existing technology.

As shown in FIG. 1, a method for scheduling and displaying three-dimensional annotations, which includes the following steps:

Step 1, using a map server such as PostgreSQL and geoserver to publish WFS services, providing data services that support spatial geometric relationship queries and attribute domain queries for a browser end.

Step 2, dividing a map into a fixed number and a fixed size of grids through applying a non-hierarchical fixing grid method. After a map scale is greater than 1:30000, finding grids that intersects a visible range of the map, taking one grid as an unit, and requesting GeoJSON data from a server.

Step 3, constructing a data storage structure on the browser end, applying R-Tree to receive GeoJSON point data from the server; after receiving the point data, initializing an avoidance based on a relationship between difference in screen pixel and difference in latitude and longitude at different scales of two identical points, and storing avoidance results in different data structures according to different scales.

Step 4, calculating the visible range of the map when a perspective of the map changes, and calculating a relationship between difference in screen pixel and difference in latitude and longitude of two different points on the map at a current scale; retrieving the data stored in a browser according to the R-Tree algorithm, if grids that intersect with this range does not obtain data from the server, requesting data from the server by taking one grid as an unit, and storing the data in a browser cache.

Step 5, obtaining a pixel value represented by 1 degree longitude and latitude by comparing the difference in screen pixel and the difference in latitude and longitude between different points at the current scale of the map in Web Worker multi-threading, so as to obtain a pixel width and a pixel height of an annotation point; calculating an avoidance relationship of the annotation point through the longitude, the latitude, the pixel width and the pixel height of the annotation point, and preliminarily filtering out overlapping data in the multi-threading.

Step 6, performing a further refine avoidance on the result data in step 5 in a UI main thread, converting latitude and longitude coordinates and screen pixel coordinates to obtain a screen pixel position displayed in annotations from the current perspective, and performing an avoidance calculation with other displayed annotations;

Step 7, performing a rasterization processing on vector texts, drawing texts in the multi-threading by using OffscreenCanvas, and converting the texts to raster images.

Step 8, adding the annotations that need to be displayed to the map through the raster images of the longitude and latitude coordinates and the texts, wherein the annotations that have already been displayed are cached in a memory of the browser, and the annotations that do not need to be displayed from the current perspective are temporarily hidden.

Specifically, using WFS as a data provider service, WFS constructs query conditions through OGC Filter to support queries based on spatial geometric relationships, attribute domains, and joint queries based on spatial relationships and attribute domains. Utilizing the characteristics of WFS services, the data on the server end is constructed and returned in the following ways, including the following aspects:

1. Store the data in a relational database and use a map server to publish the data table as a WFS service.
2. Request the server through a URL in HTTP and filter the data to be displayed by constructing a CQL Filter parameter.
3. Return point data in GeoJSON format containing attributes.

In one embodiment, for Step 2, it can divide lines at intervals of 0.2 degrees between a longitude of −180 degrees to 180 degrees and a latitude of −90 degrees to 90 degrees on the map, to divide the map into a fixed grid with a width of 0.2 degrees*0.2 degrees. Then, when the perspective of the map changes, the intersection calculation is performed using a perspective range of the map and grids of the map, grids that intersects with the perspective range requests data from the server and stores the data in the browser.

Specifically, there are two methods for data scheduling. Considering different data volumes, one is that the data volume is very large and cannot be fully loaded at once, and the other is that the data volume is small and can be fully loaded.

For data with a large amount of data, it is not possible to load it in full at once. Traditional tile scheduling divides the map into tiles of the same size at different levels and and load the tiles that need to be displayed in a hierarchical manner with row and column numbers. As the levels increase, the clarity increases. This way works well in the slicing map service of raster images. However, if use the idea of map slicing for three-dimensional annotation scheduling, it will result in new annotations being loaded at each level, even if the same annotation has already been loaded at the previous level, it still needs to be loaded repeatedly at the current level. The slicing of each level is too fine, undoubtedly increasing the number of HTTP requests, increasing the data processing volume on the browser side, slowing down display speed, increasing data redundancy, and increasing the computational burden on the server.

Figure 4:
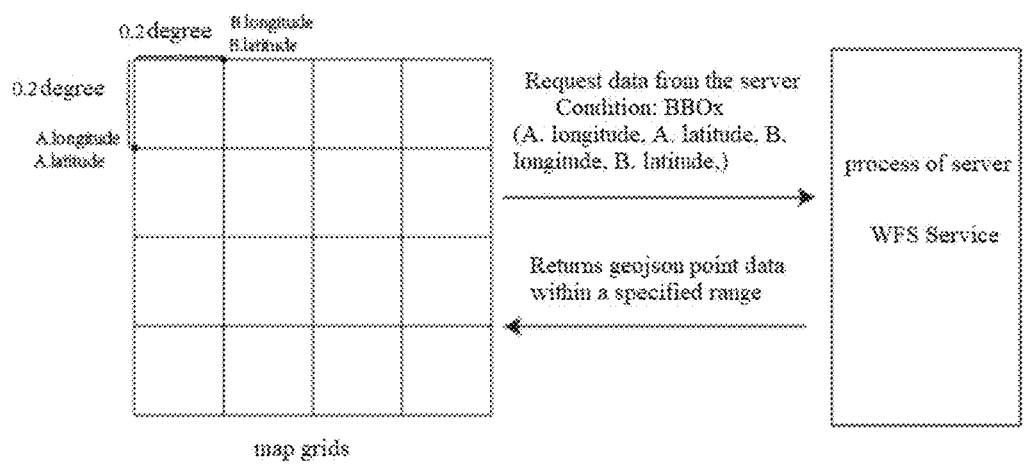
FIG. 4 is a schematic diagram of dividing a 3 map into fixed grids in the present disclosure.

Therefore, in this disclosure, a non-hierarchical fixing grid method is used for data scheduling. The browser divides the map into fixed size grids, such as dividing a line every 0.2 degrees at longitude −180 degrees to 180 degrees and latitude −90 degrees to 90 degrees, so that the global grid is divided into fixed grids with a width of 0.2 degrees*0.2 degrees. The fixed calculation method allows the browser to cache server data, reducing the number of requests and data transmission The loading method is shown in FIG. 4.

Figure 5:
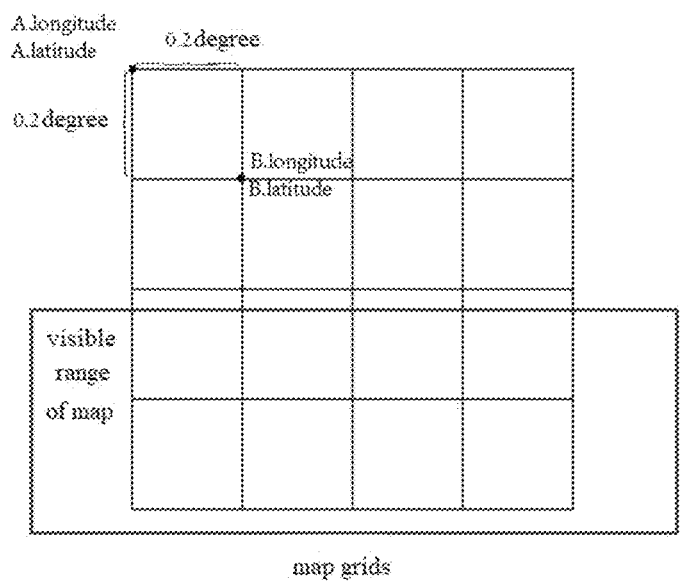
FIG. 5 is a schematic diagram of using visible range to obtain a display grid in the present disclosure.

After the map scale is greater than 1:30000, the visible range of the map is calculated. If the grid intersects with the visible range, data needs to be requested from the server, as shown in FIG. 5.

A CQL Filter is constructed through the spatial range BBOX to request the WFS service for the grid that needs to load data in sequence, so as to obtain the data that needs to be displayed for that grid. The grid is generated in a fixed manner, so that each grid only needs to request the server once, thus avoiding unnecessary requests and data redundancy.

In one embodiment, for Step 3, preliminarily calculating a height and a width of the text based on a style of the text, a content of the text, and numbers of line breaks of the text; performing a data initialization avoidance according to the "pixel value represented by 1 longitude and latitude" of different hierarchies of map, and dividing the result data of the data initialization avoidance of each hierarchy of the map into different data structures for storage, with a largest hierarchy storing all the data in full volume. Wherein the "pixel value represented by 1 longitude and latitude" refers that the ratio of the longitude and latitude distance between two points and the screen pixel distance, then the screen pixel value represented by 1 degree is obtained. Through this pixel value, use the longitude, latitude, pixel width and pixel height of the annotation point to roughly calculate the avoidance relationship of the annotation, and initially filter out a large amount of overlapping data in multi-threads, reducing the burden on the UI main thread.

Figure 6:
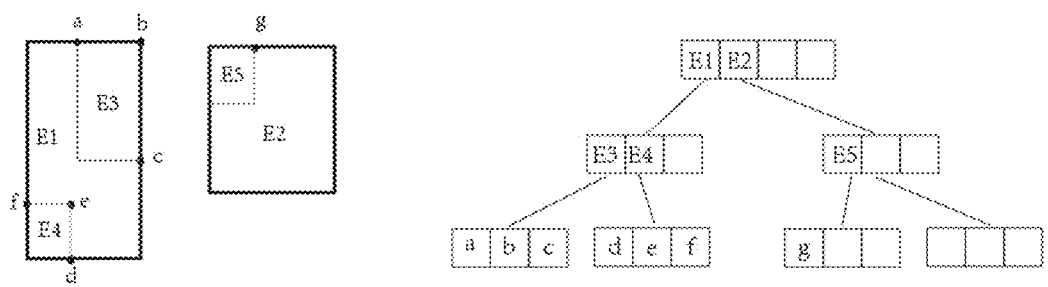
FIG. 6 is a schematic diagram of the data storage structure in the present disclosure.

Specifically, the implementation of R-Tree can be used to store point data in Rbush. This data tree structure represents each node as a rectangle, and the parent node of each node is the minimum bounding rectangle of all child nodes. The tree hierarchy is fixed, and the performance of querying and inserting data is stable. By using this data structure, data can be quickly inserted and searched on the browser side, as shown in FIG. 6.

After receiving data from the server, roughly initializing an avoidance of the data based on a relationship between difference in screen pixel and difference in latitude and longitude at different scales of two identical points. The data are stored in corresponding data structures according to different pixel values, as shown in the following table:

| Name of data structure | The Pixel value represented by 1 latitude and longitude |
| --- | --- |
| Rbush0 | 1.4220703043862788 |
| Rbush1 | 2.8441406087725576 |
| Rbush2 | 5.688281217545115 |
| Rbush3 | 11.37656243509023 |
| Rbush4 | 22.75312487018046 |
| Rbush5 | 45.50624974036092 |
| Rbush6 | 91.01249948072184 |
| Rbush7 | 182.02499896144369 |
| Rbush8 | 364.04999792288737 |
| Rbush9 | 728.0999958457747 |
| Rbush10 | 1456.1999916915495 |
| Rbush11 | 2912.399983383099 |
| Rbush12 | 5824.799966766198 |
| Rbush13 | 11649.599933532396 |
| Rbush14 | 23299.19986706479 |
| Rbush15 | 46598.39973412958 |
| Rbush16 | 93196.79946825917 |
| Rbush17 | 186393.59893651833 |
| Rbush18 | 372787.19787303667 |
| Rbush19 | 745574.3957460733 |
| Rbush20 | Full Storage |

In Step 4, it can retrieve the corresponding data structure stored in the browser according to the difference in screen pixel and the difference in longitude and latitude between two different points, then, taking the bounding rectangle of the visible range as a search criteria, first searching for a root node, if it intersects with the root node, continuing to search for its child nodes, and so on until the leaf node is retrieved, obtaining all data within the visible range.

Specifically, when the map is moved to a certain range, the visible range of the map is calculated, and the pixel values represented by 1 longitude and latitude at the current scale are calculated. The specified data structure is searched through the visible range of the map and the pixel values represented by 1 longitude and latitude.

Below is a method for quickly retrieving data in the R-tree algorithm.

Figure 7:
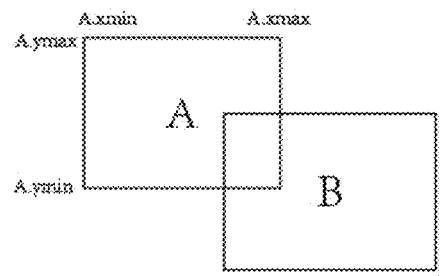
FIG. 7 is a schematic diagram shown that how to determine the intersection manners of two rectangles in the present disclosure.

Firstly, it is necessary to determine the intersection between rectangles, as shown in FIG. 7.

Figure 8:
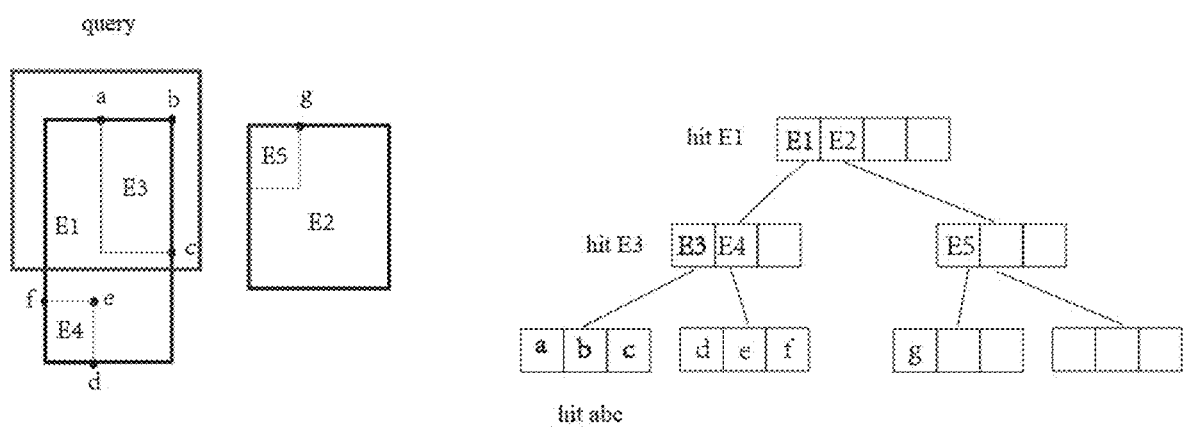
FIG. 8 is a schematic diagram of the search data method in the present disclosure.

Then, in the data structure of R-tree, if user wants to query all points within a rectangle, name the rectangle to be queried S. Firstly, it is determined whether rectangles E1 and E2 intersect with S, and it is found that they intersect with E1. Then, it is determined whether E3 and E4 intersect with S, and it is found that E3 intersects with S. Finally, the leaf nodes of E3 are found, and it is further determined whether each leaf node is within the rectangle S. Finally, this query results in points a, b, and c, as shown in FIG. 8.

By using RBush, an open-source tool of R-tree, to store annotated point data and create RBush data structures:

const tree=new RBush(9);

A data is inserted with item as the minimum bounding rectangle of the data, minX, minY as the XY of the minimum point of the rectangle, maxX, maxY as the XY of the maximum point of the rectangle:

```
const item = {
minX: 20,
minY: 40,
maxX: 30,
maxY: 50,
    property: { }
};
tree.insert(item);
For example, searching for all data within a rectangle [40,20,80,70]:
var result = tree.search({
  minX: 40,
  minY: 20,
  maxX: 80,
  maxY: 70
});
According to the visible range rectangle S on the map, use
tree.search(S);
```

To search for all points within the visible range of the map.

In one of the preferred embodiments, for Step 5, the pixel value represented by 1 degree longitude and latitude can be named A, and the visible range of the map can be named C. A and C can be sent into the Web Worker multi-thread, and the corresponding stored data structure can be found through A, and the data in A can be searched through C. By obtaining the longitude and latitude, the width, and the height of the annotation points from searching, to calculate the avoidance relationship of annotations, and preliminarily filter out overlapping data.

Specifically, calculating the plane coordinates of annotations requires occupying the main UI thread. In order to avoid overcrowding the UI display thread to cause lagging, it is necessary to roughly calculate the avoidance of annotations and filter out the annotations that may need to be displayed from a large amount of data to reduce the performance pressure of data filtering.

Figure 9:
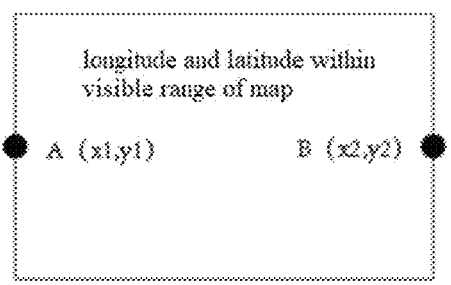
FIG. 9 is a schematic diagram of calculation of the difference in latitude and longitude of the visible range of the three-dimensional map in the present disclosure.

Calculating the latitude and longitude difference between the leftmost point and the rightmost point within the current visible range. Assuming that point A has a latitude and longitude of A (x1, y1), point B has a latitude and longitude of B (x2, y2), and the latitude and longitude difference between the two points is AB, as shown in FIG. 9.

Figure 10:
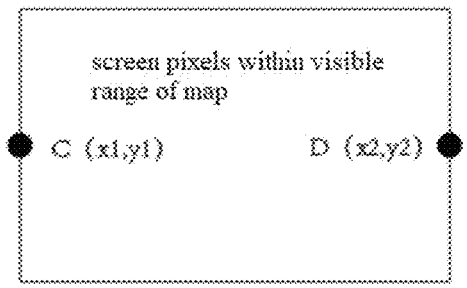
FIG. 10 is a schematic diagram of the pixel difference calculation method for the visible range of a three-dimensional map in the present disclosure.

Calculating the difference in plane coordinates between the leftmost point and the rightmost point within the current visible range. Assuming that the screen coordinates of point C are C (x1, y1), point B is D (x2, y2), and the pixel difference between the two points is CD, as shown in FIG. 10.

The 1 degree longitude and latitude represents a pixel value of (difference between two pixels CD/difference between two points longitude and latitude AB).

By obtaining the pixel value corresponding to 1 degree latitude and longitude (named F), the rough collision of the point can be calculated based on its latitude and longitude:

```
var isCollides = collisionRree.collides({
    minX: longitude of annotation * F - (pixel width/2 of annotation),
    minY: latitude of annotation * F - (pixel height/2 of annotation),
    maxX: longitude of annotation * F + (pixel width/2 of annotation),
    maxY: latitude of annotation * F + (pixel height/2 of annotation)
});
If isColledes is false, it means that there are currently no annotations
displayed for the range, and the range of annotation is added to the R tree:
collisionRree.add({
    minX: longitude of annotation * F - (pixel width/2 of annotation),
    minY: latitude of annotation * F - (pixel height/2 of annotation),
    maxX: longitude of annotation * F + (pixel width/2 of annotation),
    maxY: latitude of annotation * F + (pixel height/2 of annotation)
});
```

If isColledes is false, it means that there are currently no annotations displayed for the range, and the range of annotation is added to the R tree:

```
var isCollides = collisionRree.collides
({
    minX: pxPosition.x - (width/2 of annotation),
    minY: pxPosition.y - (height/2 of annotation),
    maxX: pxPosition.x + (width/2 of annotation),
    maxY: pxPosition.y + (height/2 of annotation)
});
```

All points within the visible range are calculated in this way to obtain all possible annotations that may need to be displayed.

JavaScript is a single threaded language, which means that the program will execute in the specified order step by step and cannot pass through blockages. Moreover, the UI and computation threads are the same, which means that implementing a large number of operations on JavaScript can cause the entire web page to have a strong sense of lag and reduce the user experience. The limitation of JavaScript Web Worker multi-threading technology is that it cannot directly manipulate DOM nodes.

Figure 11:
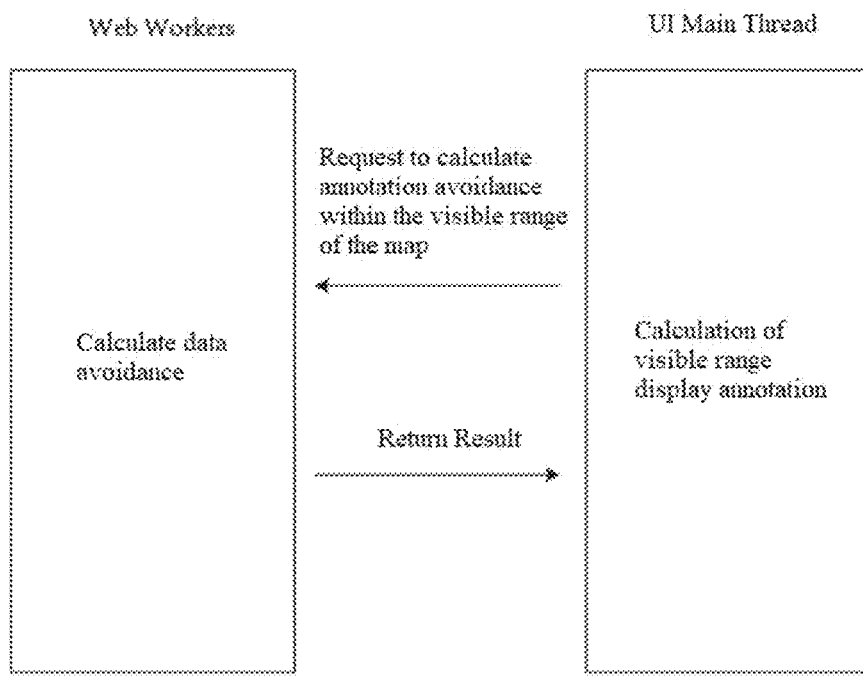
FIG. 11 is a schematic diagram of the multi-threaded computing annotation avoidance process in the present disclosure.

When the data volume is large, the algorithm in Step 5 consumes a lot of computing power, which means that in a single threaded web page, there will be a period of lag. Combining the characteristics of JavaScript Web Worker and the algorithm in Step 5, time-consuming avoidance calculations can be run in Web Worker, and the avoidance results can be returned to the main thread, as shown in FIG. 11.

In another embodiment, for Step 6, the screen pixel position where the annotation point is located is determined based on the longitude and latitude of the annotation; when the obtained pixel position is greater than an actual value of a screen or less than 0, it represents that the annotation is not currently displayed on the screen; constructing an Rbush data structure B, according to the screen pixel coordinates, the height, and the width of the annotation, to retrieve whether a range of the annotation intersects with the displayed annotation range in B, if it does not intersect, adding the range of the annotation to B, indicating that it needs to be displayed.

Specifically, unlike the rough annotation avoidance calculation in step 5, this step involves obtaining the precise pixel coordinates of the annotation and the actual width and the height of the annotation to accurately calculate whether it should be displayed on the map. Step 6 is provided to reduce the computational burden of this step, as it requires the use of Dom elements, which will consume a large number of UI threads and can only be calculated in UI threads. The preliminary screening in Step 6 reduces the pressure on UI threads.

After obtaining rough display data, the avoidance relationship is accurately calculated again in the main thread, and an Rbush data structure is reconstructed to determine the avoidance relationship. The calculation of the avoidance relationship uses the plane pixel coordinates of the points ((0, 0) is the coordinate at the top left corner of the screen, and (maximum height of the screen, maximum width of the screen) is the coordinate at the bottom right corner) and the width and the height of the screen pixels occupied by the annotations.

This method requires calculating the pixel coordinates of the screen where the latitude and longitude of the point are located, and obtaining the pixel coordinates of a latitude and longitude point:

To obtain the screen pixel coordinate pxPosition where the annotation point is located.

```
collisionRree.add({
    minX: pxPosition.x - (width/2 of annotation),
    minY: pxPosition.y - (height/2 of annotation),
    maxX: pxPosition.x + (width/2 of annotation),
    maxY: pxPosition.y + (height/2 of annotation)
});
```

If isColledes is false, it means its location is not occupied by other annotations and can be displayed on the map:

```
mapthree-dimensional.addLabel({
    position : [108.0, 22.0],
    image : image
});.
```

All annotation points within the visible range obtained in step 5 are calculated in this way, and finally obtain all points that need to be displayed.

In one embodiment, as to Step 7, sending text contents, stroke widths, stroke colors, text sizes, text fonts, text fill colors, and line breaks into the Web Worker multi-threading as parameters; calculating the height and the width required for converting the texts into an image, creating the image using OffscreenCanvas, and drawing the image according to the text style; finally, performing a rasterization processing on the image, and returning the rasterized image to the main thread for display in the WebGL map.

Specifically, vector text consumes more performance during the rendering process than rasterized data. Therefore, rasterizing text to improve rendering performance includes styles such as text fill color, text stroke color, text stroke width, and text size. The following method is to use the canvas object in JavaScript language to draw text and convert the drawn text into an image, in order to rasterize the annotations.

```
var canvas = document.createElement("canvas");
var ctx= canvas.getContext("two-dimensional");
ctx.font="20px Georgia";
ctx.strokeStyle = "#000";
ctx.strokeText("Hello World!",10,50);
ctx.fillStyle= "#fff";
ctx.fillText("Hello World!",10,50);
var image = new Image( );
image.src = canvas.toDataURL("image/png");
```

Figure 12:
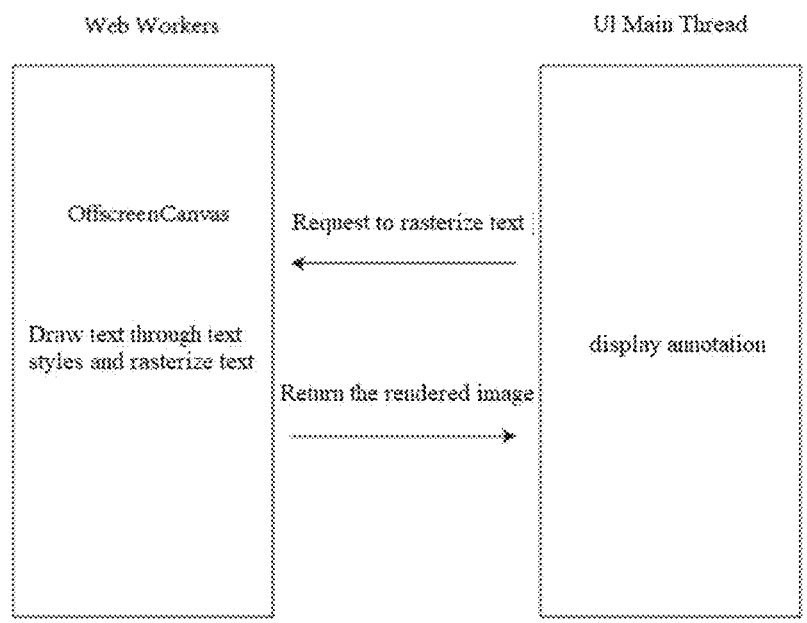
FIG. 12 is a schematic diagram of the multi-threaded image rendering process in the present disclosure.

OffscreenCanvas and Canvas are both objects that render graphics in HTML. The difference is that Canvas can only be used in the window environment of the main thread of web page, while OffscreenCanvas can be used in both the window environment and multi-threaded Web Worker, making it possible to perform off screen rendering without affecting the main thread of browser. The text rasterization in Step 8 can be achieved through multi-threaded image drawing, which greatly reduces the computational pressure on UI threads, as shown in FIG. 12.

Adding annotations to the map based on the latitude and longitude of the annotations and the rasterized images of the text:

mapthree-dimensional.addLabel({
   position: [108.0, 22.0],
   image: image
});.

Figure 13:
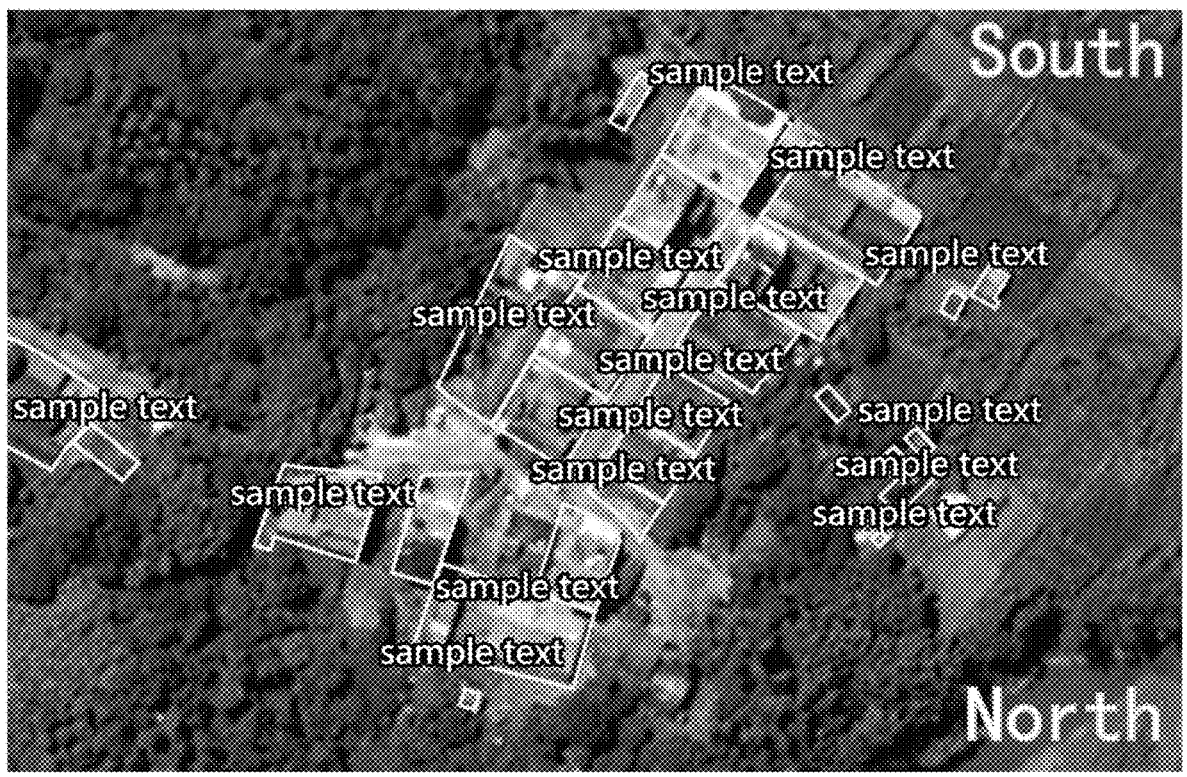
FIG. 13 is a schematic diagram of a three-dimensional map display effect using one of the annotation methods of the present disclosure.
Figure 14:
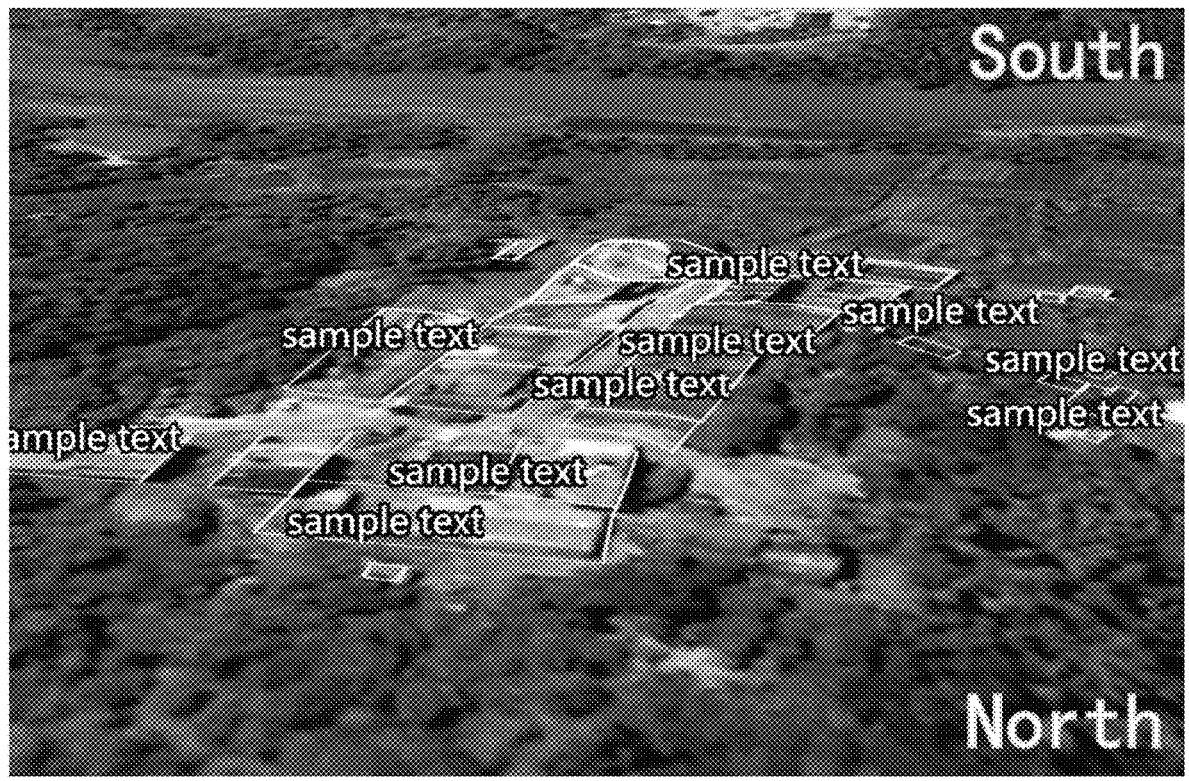
FIG. 14 is a schematic diagram of another three-dimensional map display effect using another annotation method of the present disclosure.

As shown in FIGS. 13 and 14, compared with prior art, a method for scheduling and displaying three-dimensional annotations in the present disclosure has the following advantageous effects:
1. Through step 2, the annotation uses a non-hierarchical fixing grid method, which no longer loads onto the three-dimensional map in a slicing manner, effectively avoiding the problem of annotation text inversion in the three-dimensional map. At the same time, large-scale annotation data can be scheduled for loading;
2. Through step 8, the latitude-longitude and grid based annotations are added to the map, unlike using tile loading, annotations can maintain non-hierarchical scaling and maintain a fixed size throughout any range of three-dimensional maps, improving the aesthetics of the map;
3. By using the annotation avoidance algorithm from step 3 to step 6, annotations can be efficiently displayed in real-time and avoid overlapping annotations at the same time;
4. By using of the data scheduling method, the data storage method, the collision avoidance algorithm, and the annotation display method, the present disclosure enables efficient display of a large number of annotations on a three-dimensional platform.

The above embodiments are only used to illustrate the technical solution of the present disclosure and not to limit it. Any modifications or equivalent replacements that do not deviate from the spirit and scope of the present disclosure should be covered within the scope of the technical solution of the present disclosure.

What is claimed is:

1. A method for scheduling and displaying three-dimensional annotations, comprising:
step 1, using a map server to publish WFS services, providing data services that support spatial geometric relationship queries and attribute domain queries for a browser end;
step 2, dividing a map into a fixed number and a fixed size of grids through applying a non-hierarchical fixing grid method; after a map scale is greater than 1:30000, finding grids that intersects a visible range of the map; taking one grid as an unit, and requesting GeoJSON data from the map server;
step 3, constructing a data storage structure on the browser end, applying R-Tree data structure to receive and store GeoJSON point data from the map server; after receiving the GeoJSON point data, initializing an avoidance based on a relationship between difference in screen pixel and difference in latitude and longitude at different scales of two identical points, and storing avoidance results in different data structures according to different scales;
step 4, calculating the visible range of the map when a perspective of the map changes, and calculating a relationship between difference in screen pixel and difference in latitude and longitude of two different points on the map at a current scale; retrieving the data stored in a browser according to the R-Tree algorithm, if grids that intersect with this range does not obtain data from the map server, requesting data from the map server by taking one grid as an unit, and storing the data in a browser cache;
step 5, obtaining a pixel value represented by 1 degree longitude and latitude by comparing the difference in screen pixel and the difference in latitude and longitude between different points at the current scale of the map in Web Worker multi-threading, so as to obtain a pixel width and a pixel height of an annotation point; calculating an avoidance relationship of the annotation point through the longitude, the latitude, the pixel width and the pixel height of the annotation point, and preliminarily filtering out overlapping data in the multi-threading;
step 6, performing a further refine avoidance on the result data in step 5 in a UI main thread, converting latitude and longitude coordinates and screen pixel coordinates to obtain a screen pixel position displayed in annotations from the current perspective, and performing an avoidance calculation with other displayed annotations;
step 7, performing a rasterization processing on vector texts, drawing texts in the multi-threading by using OffscreenCanvas, and converting the texts to raster images;
step 8, adding the annotations that need to be displayed to the map through the raster images of the longitude and latitude coordinates and the texts, wherein the annotations that have already been displayed are cached in a memory of the browser, and the annotations that do not need to be displayed from the current perspective are temporarily hidden;
wherein in step 2, dividing lines at intervals of 0.2 degrees between a longitude of −180 degrees to 180 degrees and a latitude of −90 degrees to 90 degrees on the map to divide the map into a fixed grid with a width of 0.2 degrees*0.2 degrees; then, when the perspective of the map changes, the intersection calculation is performed using a perspective range of the map and grids of the map, grids that intersects with the perspective range requests data from the map server and stores the data in the browser.

2. The method for scheduling and displaying three-dimensional annotations according to claim 1, wherein, in step 3, preliminarily calculating a height and a width of the text based on a style of the text, a content of the text, and numbers of line breaks of the text; performing a data initialization avoidance according to the "pixel value represented by 1 longitude and latitude" of different hierarchies of map, and dividing the result data of the data initialization avoidance in each hierarchy of the map into different data structures for storage, with a largest hierarchy storing all the data in full volume.

3. The method for scheduling and displaying three-dimensional annotations according to claim 1, wherein, in step 4, the data is in a tree structure with fixed levels, each node on a tree represents a rectangle, all leaf nodes represent a piece of data, and each parent node represents a minimum bounding rectangle of all child node sets; retrieving the corresponding data structure stored in the browser according to the difference in screen pixel and the difference in longitude and latitude between two different points, then, taking an outer rectangle of the visible range as a search criteria, first searching for a root node, if it intersects with the root node, continuing to search for its child nodes, and so on until the leaf node is retrieved, obtaining all data within the visible range.

4. The method for scheduling and displaying three-dimensional annotations according to claim 1, wherein, in step 5, the pixel value represented by 1 degree longitude and latitude is named A, and the visible range of the map is named C, A and C are sent into the Web Worker multi-threading, the corresponding stored data structure is found through A, the data in A is searched through C; through searching to obtain the longitude and latitude, the annotation width, and the height of the annotation point are obtained, calculating the avoidance relationship of the annotations, and preliminarily filtering out the overlapping data.

5. The method for scheduling and displaying three-dimensional annotations according to claim 1, wherein, in step 6, the screen pixel position where the annotation point is located is determined based on the longitude and latitude of the annotation; when the obtained pixel position is greater than an actual value of a screen or less than 0, it represents that the annotation is not currently displayed on the screen; constructing an Rbush data structure B, according to the screen pixel coordinates, the height and the width of the annotation, to retrieve whether a range of the annotation intersects with the displayed annotation range in B, if it does not intersect, adding the range of the annotation to B, indicating that it needs to be displayed.

6. The method for scheduling and displaying three-dimensional annotations according to claim 1, wherein, in step 7, sending text contents, stroke widths, stroke colors, text sizes, text fonts, text fill colors, and line breaks into the Web Worker multi-threading as parameters; calculating the height and the width required for converting the texts into an image, creating the image using OffscreenCanvas, and drawing the image according to the text style; finally, performing a rasterization processing on the image, and returning the rasterized image to the main thread for display in the WebGL map.

* * * * *